Figure 1:
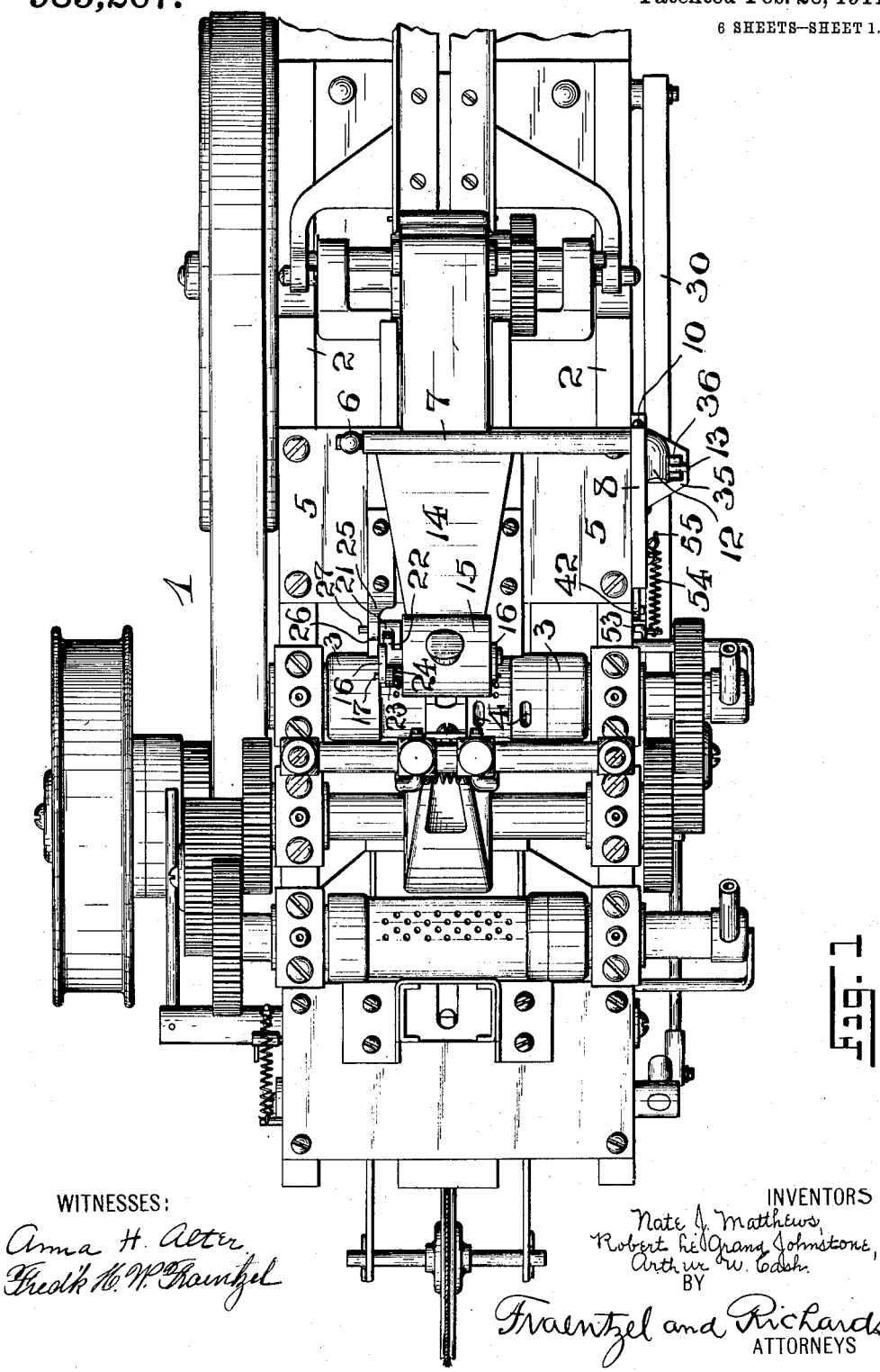

N. J. MATTHEWS, R. LE G. JOHNSTONE & A. W. CASH.
WRAPPING MACHINE.
APPLICATION FILED JULY 30, 1909. RENEWED JUNE 22, 1910.

985,267.

Patented Feb. 28, 1911.
6 SHEETS—SHEET 1.

WITNESSES:
Anna H. Alter.
Fredk H. W. Fraentzel

INVENTORS
Nate J. Matthews,
Robert LeGrange Johnstone,
Arthur W. Cash.
BY
Fraentzel and Richards,
ATTORNEYS N. J. MATTHEWS, R. LE G. JOHNSTONE & A. W. CASH.
WRAPPING MACHINE.
APPLICATION FILED JULY 30, 1909. RENEWED JUNE 22, 1910.

985,267.

Patented Feb. 28, 1911.

6 SHEETS—SHEET 3.

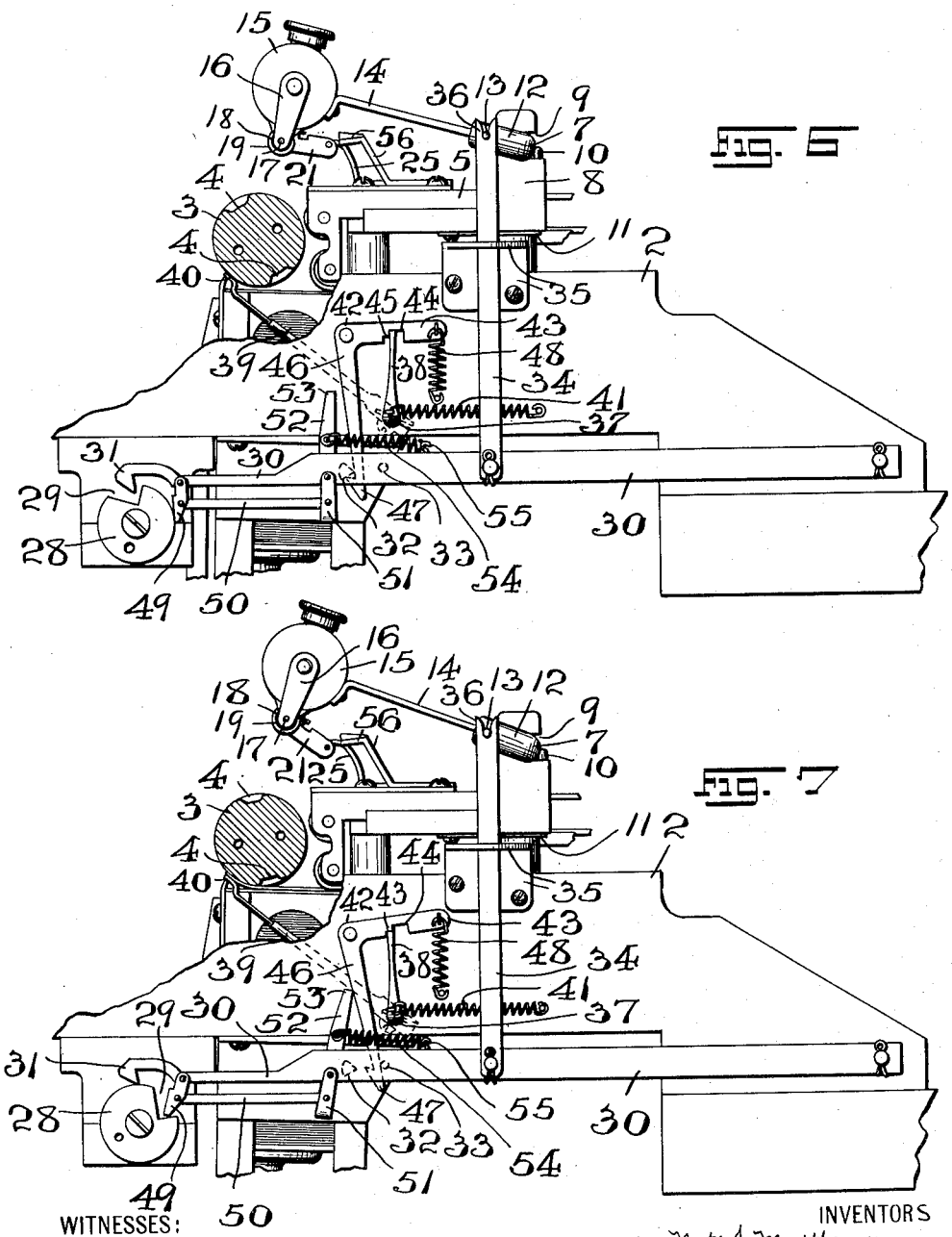

N. J. MATTHEWS, R. LE G. JOHNSTONE & A. W. CASH.
WRAPPING MACHINE.
APPLICATION FILED JULY 30, 1909. RENEWED JUNE 22, 1910.
985,267.
Patented Feb. 28, 1911.
6 SHEETS—SHEET 6.
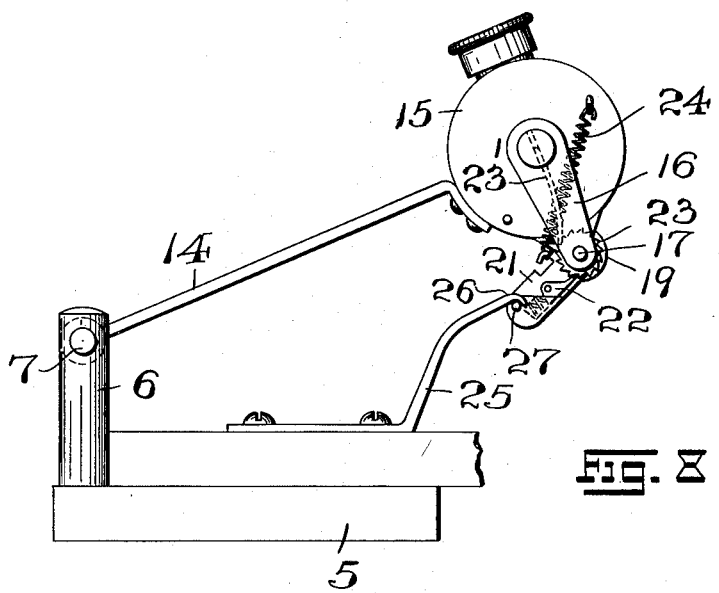
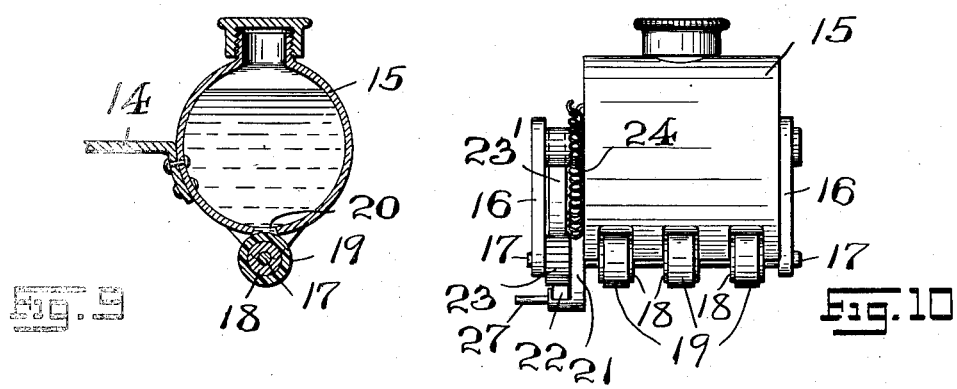
WITNESSES:
Anna H. Alter
Fredk H. W. Fraentzel
INVENTORS
Nate J. Matthews
Robert Le Grand Johnstone
Arthur W. Cash
BY Fraentzel and Richards
ATTORNEYS

UNITED STATES PATENT OFFICE.

NATE J. MATTHEWS, OF NEWARK, ROBERT LE GRAND JOHNSTONE, OF GLEN RIDGE, AND ARTHUR W. CASH, OF NEWARK, NEW JERSEY.

WRAPPING-MACHINE.

985,267.  Specification of Letters Patent.  Patented Feb. 28, 1911.

Application filed July 30, 1909, Serial No. 510,426. Renewed June 22, 1910. Serial No. 568,406.

*To all whom it may concern:*

Be it known that we, NATE J. MATTHEWS, ROBERT LE GRAND JOHNSTONE, and ARTHUR W. CASH, citizens of the United States, the said NATE J. MATTHEWS residing at Newark, the said ROBERT LE GRAND JOHNSTONE at Glen Ridge, and the said ARTHUR W. CASH at Newark, county of Essex, and State of New Jersey, have invented certain new and useful Improvements in Wrapping-Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in automatic wrapping and labeling machines; and, the invention relates, more particularly, to an improvement in that class of wrapping machines such as disclosed in an application of Nate J. Matthews, filed January 28th, 1909, and Serial Number 474,699.

The principal object of the present invention is to provide a novel and automatically operating and controlled gumming device for providing the label or the wrapper, which is to be wrapped upon the articles operated upon by the machine, with a deposit of gum or adhesive mixture, whereby the said label or wrapper may be retained upon said articles in its wrapped or incasing position.

A further object of this present invention is to provide a novel and simple construction of gum-cup or reservoir, with means connected therewith for controlling the flow of the gum or adhesive mixture therefrom, and for depositing the same in proper quantities upon the label or wrapper to be gummed.

A still further object of the present invention is to provide a novel means for controlling the operative movements of said gum-cup or reservoir to properly time the same; and, furthermore, to automatically restrain the operative movements thereof, when the supply of wrappers or labels are exhausted, so that the gum or adhesive mixture will not be deposited upon the surface of the wrapping roll of the machine, and thus cause the wrappers or labels to stick thereto and interfere with the proper operation of the wrapping machine when the supply of wrappers or labels is renewed, and the machine resumes its wrapping operations.

Other objects of the present invention not at this time more particularly mentioned will be clearly understood from the following detailed description of the said invention.

With the various objects of the invention in view, the same consists, primarily, in the novel gumming devices hereinafter set forth; and, furthermore, this invention consists in the novel arrangements and combinations of the various devices and parts, as well as in the details of the construction of the same, all of which will be hereinafter more fully set forth in the following specification, and then finally embodied in the clauses of the claims which are appended to and which form an essential part of this specification.

The invention is clearly illustrated in the accompanying drawings, in which:—

Figure 2:
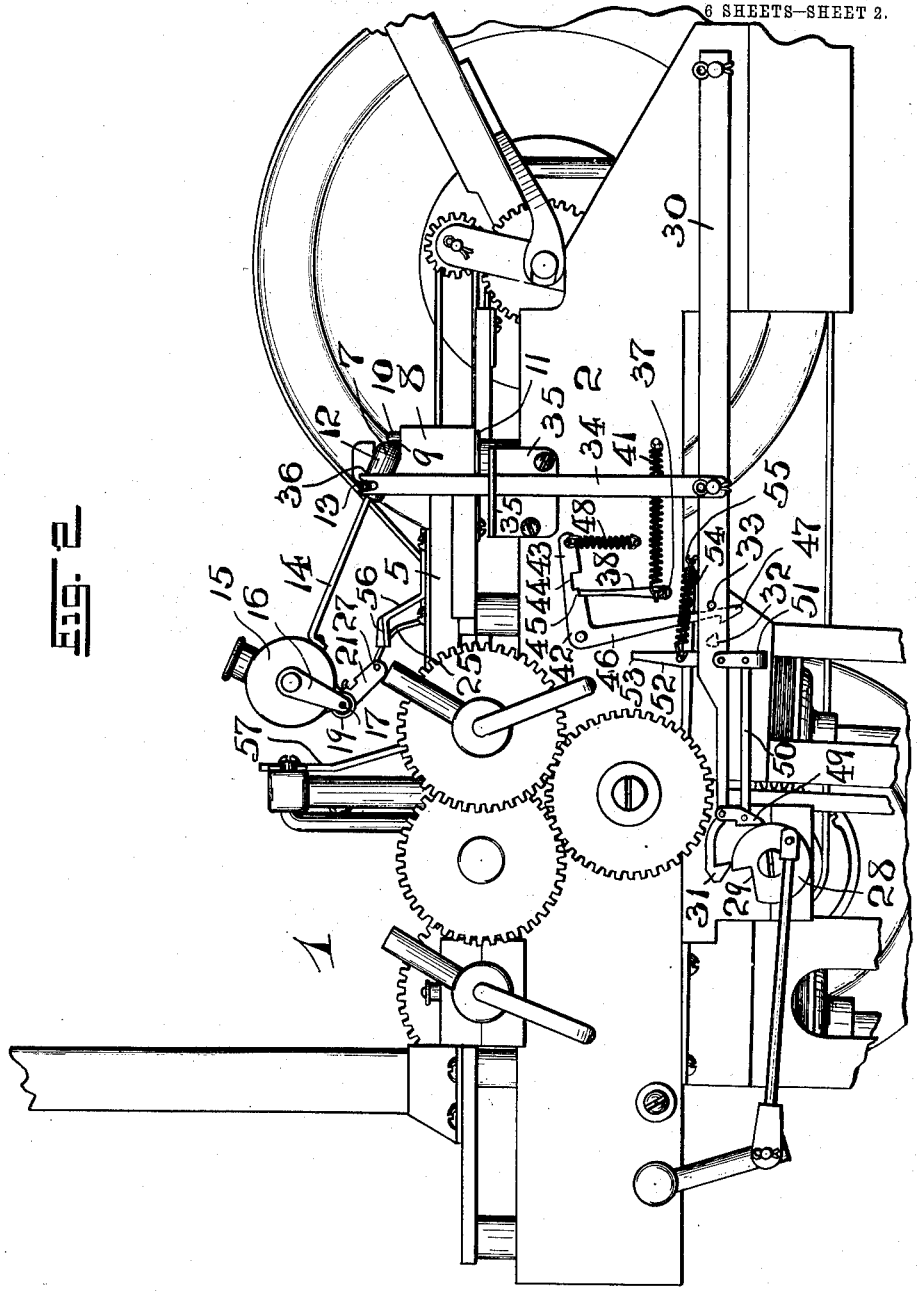
Figure 3:
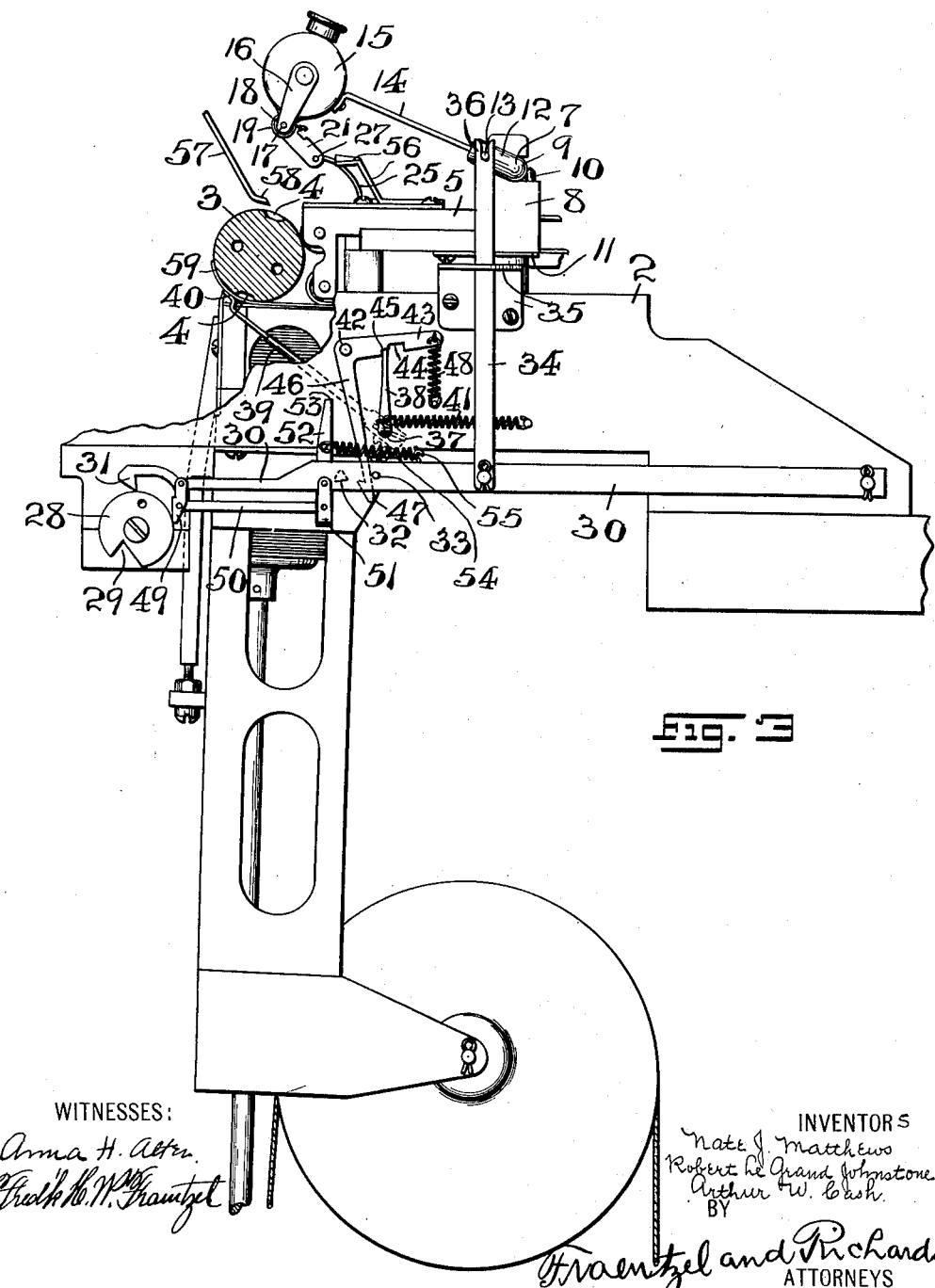
Figure 4:
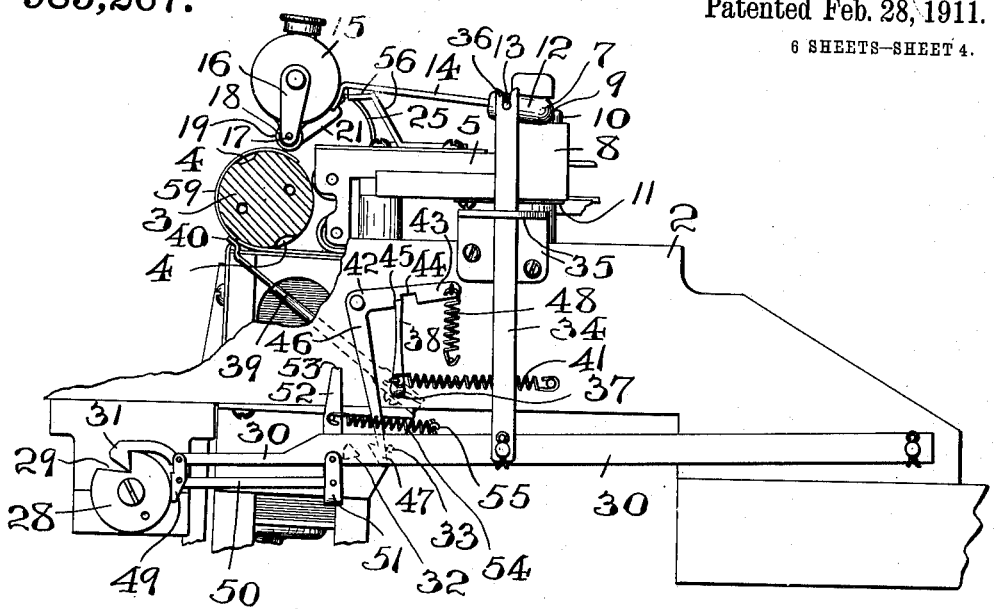
Figure 5:
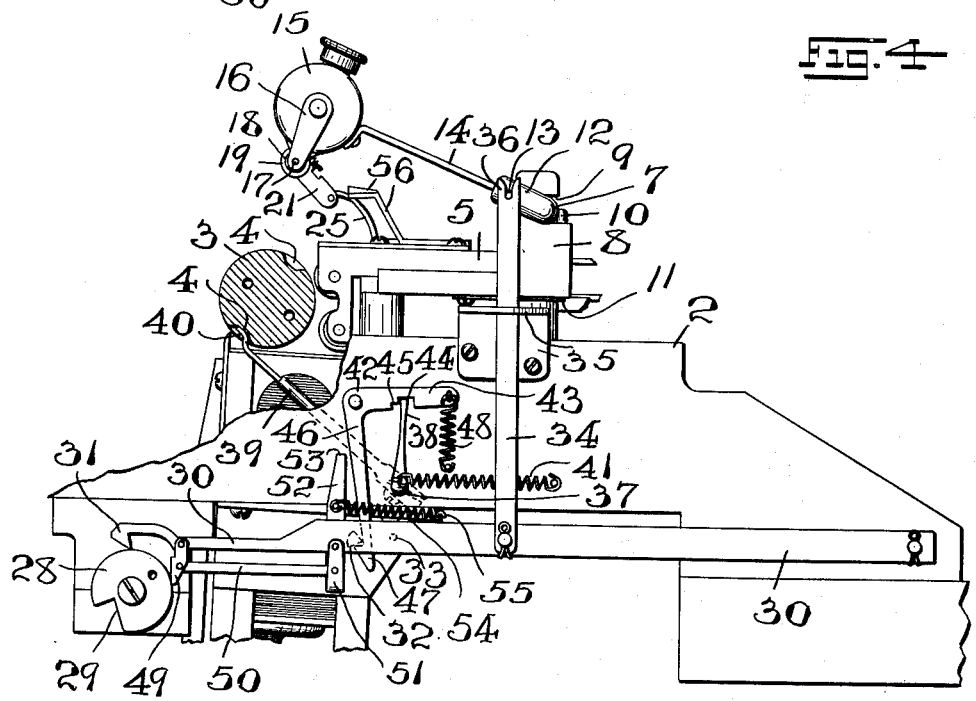

Figure 1 is a plan view of a wrapping machine, the same being provided with gumming devices made according to and embodying the principles of the present invention. Fig. 2 is a side elevation of the same. Fig. 3 is a detail part side elevation and part vertical cross-section, illustrating more particularly the gumming device, and means for automatically controlling and operating the same. Fig. 4 is a similar detail view, illustrating the operation of said gumming device. Figs. 5, 6 and 7 are similar views, but showing more particularly the various stages of the movements of the controlling means of said gumming device for preventing the operation of the same, when the wrappers or labels are exhausted; or when, for any other reason, the wrapping-roll or cylinder fails to pick up a wrapper or label. Fig. 8 is a detail side view of the gum-cup or reservoir, and illustrates, more particularly, the novel means for controlling the flow of the gum or adhesive mixture therefrom. Fig. 9 is a detail cross-section of said gum-cup or reservoir; and Fig. 10 is an end elevation of the same.

Similar characters of reference are employed in all of the above described views, to indicate corresponding parts.

Referring now to the several figures of the drawings, the reference-character 1 indicates the complete wrapping machine, the same being constructed with a frame-work 2 in which are mounted the various operating devices and their parts.

Operatively mounted in suitable bearings connected with said frame-work 2 is one of the wrapping-rollers, in this case the label-roll 3, the same being provided in a suitable position upon its outer surface with a pair of depressions or short grooves 4. Secured upon a platform 5, which is suitably connected with said frame-work 2, is an upwardly extending rod or arm 6, so secured as to permit of its being turned upon its vertical axis, and mounted in the free end of said rod or arm 6, so as to be capable of oscillation, is one end of a rock shaft 7, the other end of which is supported by a bracket 8. Said bracket 8 is provided with a cut-away portion 9 adapted to receive said rock-shaft 7, said shaft being retained in proper position by means of a locking-pin 10 which passes vertically through said bracket 8, and is maintained in its locking or operative position by means of a flat spring 11 which is secured to the bottom of said bracket 8 and which registers with the bottom of the said pin 10. The said rock-shaft 7 is provided at the end, which is supported by said bracket, with a right-angled extension or arm 12 which carries a suitably disposed pin or stud 13. Connected with said rock-shaft 7 is an outwardly extending supporting-arm 14 upon the free end of which is suitably secured and mounted a gum-cup or reservoir 15 which is preferably cylindrical in shape. Secured upon the ends of said gum-cup are downwardly extending arms 16, and mounted in the lower ends of said arms is a longitudinally extending shaft 17. Suitably arranged upon said shaft 17 are rollers 18 which are provided with a surface-covering 19, of rubber, or some similar resilient material. These said rollers 18 are adapted to register with suitable openings 20 which form the outlets for the gum or adhesive mixture contained in said gum-cup or reservoir. Loosely arranged on said shaft 17 is an arm or lever 21 which is provided with a spring-actuated dog or pawl 22, said dog or pawl being in operative engagement with a ratchet-wheel 23 which is rigidly secured upon said shaft 17; and, the movement of which is controlled and its turning maintained in one direction by means of a stop pawl 23¹. A coiled spring 24 connects said arm or lever 21 with the said gum-cup or reservoir 15, and the purpose of said spring is to tend to raise said arm or lever 21 when the gum-cup or reservoir is lowered. Secured upon a portion of said platform 5 is a retaining-arm 25 which is provided with a hook-shaped end 26 adapted to engage a pin 27, said pin being secured in the free end of said arm or lever 21 and serving to keep said arm or lever lowered, when said gum-cup or reservoir is raised, whereby a proper operation of the pawl or dog 22 and ratchet-wheel 23 may be effected to turn said shaft 17 and its rollers 18, so that the gum-covered surfaces of the latter may be carried away from the gum or adhesive outlets of said gum-cup or reservoir and brought into their outwardly exposed positions, to deposit the gum or adhesive thereon upon the label or wrapper when the gum-cup or reservoir is lowered.

The means for operating the gum-cup or reservoir above described comprises the following mechanism. Secured upon one end of a driving-shaft is a cam-member 28 which is provided upon its periphery with a cut-away portion 29. Pivotally secured to the side of said frame-work 2 is a longitudinally extending lever or arm 30 provided at its free end with a rider-piece or projection 31 which rides upon the peripheral surface of said cam-member 28. Secured upon the inner side of said lever or arm 30 is a projection or lug 32 and a stop-pin 33. Pivotally connected with said lever or arm 30 is an upwardly extending connecting rod 34 which is slidably arranged in a guide-bracket 35, said guide-bracket being secured to the side of said frame-work 2. The upper end of said connecting rod 34 is provided with a forked portion 36 adapted to receive and operatively engage with said pin or stud 13 arranged upon the free end of the extension or arm 12 of said rock-shaft 7. Mounted in said frame-work 2, so as to pass transversely across the machine, is an oscillating shaft 37, one end of which projects through the side of said frame-work 2 and is formed to provide an upwardly extending arm 38. This arm 38 may form an integral part of said shaft 37; but, it is preferably flattened and tempered so as to provide the same with a certain degree of "spring" or resiliency. Secured in a proper position upon said shaft 37 is an upwardly inclined arm or lever 39 which is provided at its free end with a suitably shaped contact-piece or shoe 40, the said contact-piece or shoe 40 riding upon the surface of said label-roll 3, in proper alinement with the depressions or short grooves 4 contained therein. In order to retain said contact-piece or shoe 40 in proper riding engagement with said label-roll 3, there is provided a coiled spring 41, the one end of which is secured to said arm 38, and the other end of which is anchored or secured to a portion of said frame-work 2. Pivotally secured upon the side of said frame-work 2, adjacent to said arm 38, is a tumbler 42 which is provided with an arm 43, the same having a cut-away portion 44, on the left of which is a step or projection 45, with which the free end of said arm 38 is normally in engagement. The said tumbler 42 is further provided with a downwardly extending arm 46 formed upon its free end with a suitable nosing 47, which at a proper time, is caused to be brought in operative engagement with the projection or lug 32 of said lever or arm 30, to support the same and prevent it from dropping, in the manner and for the purpose to be subsequently described. A coiled spring 48 is connected with the free end of said arm 43 and anchored or secured to said frame-work 2 for the purpose of maintaining the proper position and operation of said tumbler 42 in conjunction with the other mechanism. Pivotally secured upon said lever or arm 30 is a trigger-member or element 49, which projects in a downward direction and the free end normally riding against the peripheral surface of said cam-member 28. Pivotally connected upon said lever or arm 30, and operatively connected with said trigger-member 49 by means of a connecting-rod 50, is a yoke 51, said yoke being provided upon one side with an upwardly extending trip or kicker-arm 52, provided, in turn, at its upper free end with a lateral projection 53 adapted to engage at a proper time with the side of said downwardly extending-arm 46 of said tumbler 42. One end-portion of a coiled spring 54 is connected with said kicker-arm 52, the other end of said spring being anchored to a suitable hook or pin 55 upon said lever or arm 30. Secured upon said platform 5 is a buffer-member 56 adapted to limit the downward movement of said gum-cup or reservoir 15.

Secured to a portion of the superstructure of said wrapping machine is a downwardly extending separator-arm 57 which is provided at its lower end with a laterally extending forked-piece 58. This separator-arm 57 tends to separate the label or wrapper 59 from the rollers 18 of said gum-cup or reservoir 15 when the latter is lowered upon the same, to deposit thereon the gum or adhesive mixture, and thereby preventing the paper-wrapper or label from being lifted when the said gum-cup or reservoir is raised, which would interfere with the proper carrying on of the wrapping operations of said wrapping machine. Another essential purpose for which the said separator-arm 57 is provided, is to form a guard for preventing the end of said label or wrapper 59, opposite to the end upon which a deposit of gum or adhesive mixture has been made, from flying or springing up against the gum cup and becoming smeared with gum or adhesive mixture, when said label or wrapper 59 is carried around by the wrapping or label-roll 3.

Having thus described the various parts, and the general constructions and arrangements thereof, which form the novel construction of automatic gumming-device, embodying the principles of our invention, we will now briefly set forth, the operation of the same. Referring to Fig. 4 of the accompanying drawings, the various parts of the gumming device are shown in their normal initial positions. Normally, the arm 38 is in engagement with the step or projection 45, whereby the tumbler 42 is maintained in such a position, that the downwardly extending arm 46, with its nosing 47, is kept away from holding engagement with the projection or lug 32, and against the stop-pin 33. Assume that the label-roll 3 revolves carrying with it the label 59. The label 59 thus carried, prevents the shoe 40 of said arm 39 from dropping into the depressions or short grooves 4 and the arm 38 and tumbler 42 are thus undisturbed, so that as the cam-member 28 revolves, the rider-piece 31 of said lever or arm 30 drops into the cutaway portion 29 of said cam-member 28, thereby permitting said lever or arm 30 to drop down. The downward movement of this lever or arm 30 is communicated to the connecting rod 34 which supports the arm 12 of said rock-shaft 7, the downward movement thereof removing the support of the same and permitting said rock-shaft 7 to oscillate, whereby the gum-cup or reservoir 15 drops upon the end of said label 59 which in the meantime has been carried beneath it, as shown more particularly in Fig. 4 of the accompanying drawings. As the cam-member 28 continues to revolve, it lifts the rider-piece 31 and consequently the lever or arm 30, whereby the gum-cup or reservoir 15 is again raised to its normal initial position. Assuming now that the supply of labels has been exhausted, or that the air has been cut off from said label-roll 13, so that it no longer picks up a label 59 as it revolves. Under such circumstances, the shoe 40 of said arm 39 travels directly upon the surface of said label-roll 3, so that it no longer picks up groove 4 is brought in registration therewith, the said shoe 40 drops into the same. The slight tipping movement of said arm 39 thus produced, causes an oscillation of said shaft 37 so that the free end of said arm 38 connected therewith is carried away from engagement with said step or projection 45, whereby the spring 48 is allowed to swing or pull down the arm 43 of said tumbler 42, and causes the nosing 47 of said arm 46 to be moved into its operative engagement with said projection or lug 32 of said lever or arm 30. Now, although the shoe 40 passes out of said depression or short groove 4, so that the arm 39 and shaft 37 are brought back to their normal initial positions, yet the free end of said arm 38 cannot resume its position upon said step or projection 45, until the arm 43 is raised; hence, the necessity that the arm 38 should have a spring-like or resilient action. With the parts in this position, the cam-member 28 may revolve; but, as the cutaway portion 29 is reached, the rider-piece 31 cannot drop down because the lever or arm 30 is locked or held against such downward movement by reason of the engagement of said nosing 47 with the projection or lug 32 thereof. Hence, the gum-cup or reservoir 15 is maintained or held in its raised position and prevented from falling upon the unprotected surface of said label-roll 3, which, unless prevented from so doing, would smear it with gum or adhesive mixture, so that when the labels 59 were again carried thereby they would be likely to stick to the surface thereof and prevent the proper manipulation of the label in carrying-out the wrapping operating of said wrapping machine.

The manner of accomplishing the return of said tumbler 42, so that the nosing 47 of its arms 46 is carried away from engagement with said projection or lug 32 of said lever or arm 30, and so that the end of said arm 38 may regain its supporting engagement with the step or projection 45 of said arm 43, is as follows: As the cam-member 28 continues to revolve, the cutaway portion 29 thereof is brought in registration or opposite to the said trigger-member 49. The coiled spring 54 thereupon acts upon the kicker-arm 52, pulls the same sharply forward, so that the lateral projection 53 is carried with some little force against the downwardly projecting arm 46 of said tumbler 42, moving the nosing 41 of the same away from contact with the projection or lug 32, and at the same time raising the arm 43, so that the end of the arm 38 may again resume its supporting engagement with said step or projection 45. This oscillating movement of said kicker-arm 52 and its yoke 51 is permitted since the pressure exerted thereon by means of the connecting rod 50 and trigger-member or element 49 is removed when said trigger-member 49 is free to move into the cutaway portion 29 of said cam-member 28, thus permitting the spring 54 to act, as will be clearly understood from an inspection more particularly of Fig. 7 of the accompanying drawings. As the cam-member 28 continues to revolve the trigger-member 49 is again forced outwardly and caused to ride upon the peripheral surface thereof, thus causing the kicker-arm 52 to resume its normal initial position. These operations are continuously carried on until the supply of labels is renewed in the machine; or, the label roll again permitted to take up a label in the ordinary course of the wrapping operations. The said gum-cup or reservoir may be detached from its operative relation with said wrapping machine in the following manner:—The arm or lever 21 and its pin 27 is disconnected from engagement with the retaining-arm 25; then, by raising the gum-cup or reservoir 15 and its supporting arm 14 the said rock-shaft 7 is turned in its bearings so that the extension 12 which carries the pin 13 is moved upwardly, thereby disengaging said pin 13 from the forked portion 36 of said rod 34. Now, by pressing the rock-shaft 7 outwardly against the locking-pin 10, the said rock-shaft 7 is removed from its supported position in the cut-away portion 9 of said bracket 8, and the rod or arm 6 which provides the opposite bearing for said rock-shaft 7 being secured to permit of its turning on a vertical axis, said rock-shaft 7 can be removed from said bracket 8 in the manner described. The rock-shaft 7 may now be easily removed from its mounted position in said rod or arm 6, and thus the gum-cup or reservoir may be removed for purposes of cleaning, adjustment, or any other desired purpose.

We are aware that changes may be made in the general arrangements and combinations of the various devices and parts, as well as in the details of the construction of the same, without departing from the scope of our present invention as set forth in the foregoing specification and as defined in the appended claims. Hence, we do not limit our invention to the exact arrangements and combinations of the devices and parts as described in the said specification, nor do we confine ourselves to the details of the construction of the said parts as illustrated in the accompanying drawings.

We claim:—

1. In gumming devices for wrapping machines and the like, the combination with a gum-cup, of means for pivotally supporting the same, and means connected with said gum-cup for controlling the flow of the gum therefrom and depositing the same upon a wrapper or label, and means connected with the driving shaft of said wrapping machine for raising and lowering said gum-cup, substantially as and for the purposes set forth.

2. In gumming devices for wrapping machines and the like, the combination with a detachable gum-cup, of means for pivotally supporting the same, said gum-cup being provided with a plurality of gum-outlets, a transverse shaft mounted below said outlets, rollers secured upon said shaft, a resilient covering connected with said rollers, said rollers being adapted to register with said gum-outlets, and means connected with said gum-cup for revolving said shaft and rollers to control the flow of gum and deposit the same upon a wrapper or label, substantially as and for the purposes set forth.

3. In gumming devices for wrapping machines and the like, the combination with a detachable gum-cup, of means for pivotally supporting the same, said gum-cup being provided with a plurality of gum-outlets, a transverse shaft mounted below said outlets, rollers secured upon said shaft, a resilient covering connected with said rollers, said rollers being adapted to register with said gum-outlets, a ratchet-wheel secured upon said shaft, a stop pawl coöperating with said ratchet wheel to permit of its rotation in but one direction, and means connected with said gum-cup for causing the intermittent rotation of said ratchet-wheel, shaft and rollers, to control the flow of gum and deposit the same upon a wrapper or label, substantially as and for the purposes set forth.

4. In gumming devices for wrapping machines and the like, the combination with a detachable gum-cup, of means for pivotally supporting the same, said gum-cup being provided with a plurality of gum-outlets, a transverse shaft mounted below said outlets, rollers secured upon said shaft, a resilient covering connected with said rollers, said rollers being adapted to register with said gum-outlets, a ratchet-wheel secured upon said shaft, a stop pawl coöperating with said ratchet-wheel to permit of its rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine, to operatively engage with the pin of said spring-retained arm, substantially as and for the purposes set forth.

5. In gumming devices for wrapping machines and the like, the combination with a detachable gum-cup, of means for pivotally supporting the same, said gum-cup being provided with a plurality of gum-outlets, a transverse shaft mounted below said outlets, rollers secured upon said shaft, a resilient covering connected with said rollers, said rollers being adapted to register with said gum-outlets, a ratchet-wheel secured upon said shaft, a stop-pawl coöperating with said ratchet-wheel to permit of the rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine adapted to operatively engage with the pin of said spring-retained arm, and means for lowering and raising said gum-cup to bring its gum covered rollers in contact with a wrapper or label, substantially as and for the purposes set forth.

6. In gumming devices for wrapping machines and the like, the combination with the frame-work of the wrapping machine, of supporting means, a transverse shaft removably mounted in said supporting means, a bracket-arm secured to said transverse shaft, a gum-cup secured upon the free end of said bracket-arm, an extension-member connected with the end of said transverse shaft, a lever-arm pivotally connected with the side of said frame-work, a connecting-rod connecting said extension-member of said transverse shaft with said lever-arm, and a rotating cam-member for operating said lever-arm, connecting-rod and transverse shaft to oscillate the latter for lowering and raising said gum-cup, substantially as and for the purposes set forth.

7. In gumming devices for wrapping machines and the like, the combination with the frame-work of the wrapping-machine, of a rotatable wrapping-roll provided with a plurality of suitably disposed depressions, a supporting means connected with said frame-work, a transverse shaft removably mounted in said supporting-means, a bracket-arm secured to said transverse shaft, a gum-cup secured upon the free end of said bracket-arm, an extension-member connected with one end of said transverse-shaft, a lever pivotally connected with the side of said frame-work, a connecting-rod connecting said extension member with said lever, a rotating cam-member for operating said lever, connecting rod and transverse shaft to oscillate the lever for lowering and raising said gum-cup, and means coöperating with said wrapping-roll and its depressions for preventing the operation of said lever when there is no wrapper or label carried by said wrapping roll, substantially as and for the purposes set forth.

8. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup secured upon the free end of said bracket-arm, means for automatically oscillating said transverse shaft for lowering and raising said gum-cup, and means coöperating with said wrapping-roll and its depressions for preventing the lowering and raising of said gum-cup when there is no wrapper or label carried by said wrapping-roll, substantially as and for the purposes set forth.

9. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup secured upon the free end of said bracket-arm, an extension-member connected with one end of said transverse shaft, a lever pivotally connected with the side of said frame-work, a connecting rod connecting said extension-member with said lever, a rider-piece connected with the free end of said lever, a rotating cam-member provided with a suitably disposed cutaway portion, the same being adapted to operate said lever through contact with its rider-piece, a spring-retained tumbler pivotally connected with said frame-work of said wrapping-machine, and means coöperating with said wrapping-roll and its depression for operating said tumbler to engage said lever and prevent the operation of the same when there is no wrapper or label carried by said wrapping-roll, substantially as and for the purposes set forth.

10. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup secured upon the free end of said bracket-arm, an extension-member connected with one end of said transverse shaft, a lever pivotally connected with the side of said frame-work, a connecting rod connecting said extension-member with said lever, a rider-piece connected with the free end of said lever, a rotating cam-member provided with a suitably disposed cutaway portion, the same being adapted to operate said lever through contact with its rider-piece, a stud connected with said lever, a spring-retained tumbler pivotally connected with said frame-work of said wrapping machine, said tumbler comprising an arm provided with a cutaway portion forming a step or projection, a downwardly extending arm, a nosing connected with said downwardly extending arm, and means coöperating with said wrapping-roll and its depressions for operating said tumbler to engage said nosing with the stud of said lever to prevent the operation of the latter when there is no label or wrapper carried by said wrapping-roll, substantially as and for the purposes set forth.

11. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup secured upon the free end of said bracket-arm, an extension-member connected with one end of said transverse shaft, a lever pivotally connected with the side of said frame-work, a connecting rod connecting said extension-member with said lever, a rider-piece connected with the free end of said lever, a rotating cam-member provided with a suitably disposed cutaway portion, the same being adapted to operate said lever through contact with its rider-piece, a stud connected with said lever, a spring-retained tumbler pivotally connected with said frame-work of said wrapping machine, said tumbler comprising an arm provided with a cutaway portion forming a step or projection, a downwardly extending arm, a nosing connected with said downwardly extending arm, a spring-actuated shaft mounted in said frame-work, an upwardly extending lever secured thereto, shoes on the free end of said lever adapted to engage said wrapping roll, in alinement with its depressions, an upwardly extending spring-arm connected with said shaft, the free end thereof being adapted to normally engage said step or projection of said tumbler arm, substantially as and for the purposes set forth.

12. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup secured upon the free end of said bracket-arm, an extension-member connected with one end of said transverse shaft, a lever pivotally connected with the side of said frame-work, a connecting rod connecting said extension-member with said lever, a rider-piece connected with the free end of said lever, a rotating cam-member provided with a suitably disposed cutaway portion, the same being adapted to operate said lever through contact with its rider-piece, a stud connected with said lever, a spring-retained tumbler pivotally connected with said frame-work of said wrapping machine, said tumbler comprising an arm provided with a cutaway portion forming a step or projection, a downwardly extending arm, a nosing connected with said downwardly extending arm, a spring-actuated shaft mounted in said frame-work, an upwardly extending lever secured thereto, shoes on the free end of said lever adapted to engage said wrapping roll, in alinement with its depressions, an upwardly extending spring-arm connected with said shaft, the free end thereof being adapted to normally engage said step or projection of said tumbler arm, and means connected with said lever for automatically releasing the engagement of the nosing of said tumbler with said stud connected with said lever-arm, substantially as and for the purposes set forth.

13. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup secured upon the free end of said bracket-arm, an extension-member connected with one end of said transverse shaft, a lever pivotally connected with the side of said frame-work, a connecting rod connecting said extension-member with said lever, a rider-piece connected with the free end of said lever, a rotating cam-member provided with a suitably disposed cutaway portion, the same being adapted to operate said lever through contact with its rider-piece, a stud connected with said lever, a spring-retained tumbler pivotally connected with said frame-work of said wrapping machine, said tumbler comprising an arm provided with a cutaway portion forming a step or projection, a downwardly extending-arm, a nosing connected with said downwardly extending arm, a spring-actuated shaft mounted in said frame-work, an upwardly extending lever secured thereto, shoes on the free end of said lever adapted to engage said wrapping roll in alinement with its depressions, an upwardly extending spring-arm connected with said shaft, the free end thereof being adapted to normally engage said step or projection of said tumbler arm, a trigger-member pivotally connected with said lever and adapted to ride against said cam-member, a spring-actuated kicker-arm pivotally connected with said lever, said kicker-arm being operatively connected with said trigger-member by means of a connecting-rod, said kicker-arms being adapted to strike the downwardly extending arm of said tumbler to automatically release the engagement of the nosing thereof with said stud connected with said lever-arm, substantially as and for the purposes set forth.

14. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket arm secured to said transverse shaft, a gum-cup provided with a plurality of gum-outlets secured upon said bracket-arm, a shaft mounted below said outlets, rollers secured upon said shaft, a resilient covering connected with said rollers, said rollers being adapted to register with said gum-outlets, a ratchet-wheel secured upon said shaft, a stop-pawl coöperating with said ratchet-wheel to permit of its rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine adapted to operatively engage with the pin of said spring-retained arm, and means for automatically oscillating said transverse shaft for lowering and raising said gum-cup, substantially as and for the purposes set forth.

15. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup provided with a plurality of gum-outlets secured upon said bracket-arm, a shaft mounted below said outlets, rollers secured upon said shaft, a resilient covering connected with said rollers, said rollers being adapted to register with said gum-outlets, a ratchet-wheel secured upon said shaft, a stop-pawl coöperating with said ratchet-wheel to permit of its rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine, a hook-shaped end upon said retaining-arm adapted to operatively engage with the pin of said spring-retained arm, an extension-member connected with one end of said transverse shaft, a lever pivotally connected with the side of said frame-work, a connecting rod connecting said extension-member of said transverse shaft with said lever, and a rotating cam-member for operating said lever to oscillate said transverse shaft for lowering and raising said gum-cup, substantially as and for the purposes set forth.

16. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup provided with a plurality of gum-outlets secured upon said bracket-arm, a shaft mounted below said outlets, rollers secured upon said shaft, a resilient covering connected with said rollers, said rollers being adapted to register with said gum-outlets, a ratchet-wheel secured upon said shaft, a stop-pawl coöperating with said ratchet-wheel to permit of its rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine, a hook-shaped end upon said retaining-arm adapted to operatively engage with the pin of said spring-retained arm, an extension-member connected with one end of said transverse shaft, a lever pivotally connected with the side of said frame-work, a connecting-rod connecting said extension-member of said transverse shaft with said lever, and a rotating cam-member for operating said lever to oscillate said transverse shaft for lowering and raising said gum-cup, and means coöperating with said wrapping roll and its depressions for preventing the operation of said lever and the consequent lowering and raising of said gum-cup when there is no wrapper or label carried by said wrapping-roll, substantially as and for the purposes set forth.

17. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup provided with a plurality of gum-outlets secured upon said bracket-arm, a shaft mounted below said outlets, rollers secured upon said shaft, a resilient covering connected with said rollers, said rollers being adapted to register with said gum-outlets, a ratchet-wheel secured upon said shaft, a stop-pawl coöperating with said ratchet-wheel to permit of its rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine adapted to operatively engage with the pin of said spring-retained arm, an extension-member connected with one end of said transverse shaft, a lever pivotally connected with the side of said frame-work, a connecting-rod connecting said extension-member of said transverse shaft with said lever, a rider-piece connected with the free end of said lever, a rotating cam-member provided with a suitably disposed cutaway portion adapted to be engaged by said rider-piece, a stud connected with said lever, a spring-retained tumbler pivotally connected with said frame-work, said tumbler comprising an arm provided with a cutaway portion forming a step or projection and a downwardly extending-arm, a nosing connected therewith, a spring-actuated shaft mounted in said frame-work, an upwardly extending lever secured thereto, shoes on the free end of said lever adapted to engage said wrapping roll, in alinement with its depressions, and an upwardly extending spring-arm connected with said shaft, the free end thereof being adapted to normally engage said step or projection of said tumbler-arm, substantially as and for the purposes set forth.

18. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket arm secured to said transverse shaft, a gum-cup provided with a plurality of gum-outlets secured upon said bracket-arm, a shaft mounted below said outlets, rollers secured upon said shaft, a resilient covering connected with said rollers, said rollers being adapted to register with said gum-outlets, a ratchet-wheel secured upon said shaft, a stop pawl coöperating with said ratchet-wheel to permit of its rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine adapted to operatively engage with the pin of said spring-retained arm, an extension-member connected with one end of said transverse shaft, a lever pivotally connected with the side of said frame-work, a connecting-rod connecting said extension-member of said transverse shaft with said lever, a rider-piece connected with the free end of said lever, a rotating cam-member provided with a suitably disposed cutaway portion adapted to be engaged by said rider-piece, a stud connected with said lever, a spring-retained tumbler pivotally connected with said frame-work, said tumbler comprising an arm provided with a cutaway portion forming a step or projection and a downwardly extending-arm, a nosing connected therewith, a spring-actuated shaft mounted in said frame-work, an upwardly extending lever secured thereto, shoes on the free end of said lever adapted to engage said wrapping roll, in alinement with its depressions, and an upwardly extending spring-arm connected with said shaft, the free end thereof being adapted to normally engage said step or projection of said tumbler-arm, and means connected with said lever for automatically releasing the engagement of the nosing of said tumbler with said stud connected with said lever-arm, substantially as and for the purposes set forth.

19. In gumming devices for wrapping machines and the like, the combination with the frame-work of the wrapping machine, of a rotatable wrapping-roll provided with a plurality of suitably disposed depressions, a supporting means connected with said frame-work, a transverse shaft removably mounted in said supporting means, a bracket-arm secured to said transverse shaft, a gum-cup provided with a plurality of gum-outlets secured upon said bracket-arm, a shaft mounted below said outlets, rollers secured upon said shaft, a resilient covering connected with said rollers, said rollers being adapted to register with said gum-outlets, a ratchet-wheel secured upon said shaft, a stop-pawl coöperating with said ratchet-wheel to permit of its rotation in but one direction, a spring-retained arm pivotally connected with said gum-cup, a spring-actuated dog secured upon said arm adapted to operatively engage said ratchet-wheel, a pin secured upon the free end of said arm, a retaining-arm connected with said wrapping machine adapted to operatively engage with the pin of said spring-retained arm, an extension-member connected with one end of said transverse shaft, a lever pivotally connected with the side of said frame-work, a connecting-rod connecting said extension-member of said transverse shaft with said lever, a rider-piece connected with the free end of said lever, a rotating cam-member provided with a suitably disposed cutaway portion adapted to be engaged by said rider-piece, a stud connected with said lever, a spring-retained tumbler pivotally connected with said frame-work, said tumbler comprising an arm provided with a cutaway portion forming a step or projection and a downwardly extending-arm, a nosing connected therewith, a spring-actuated shaft mounted in said frame-work, an upwardly extending lever secured thereto, shoes on the free end of said lever adapted to engage said wrapping roll, in alinement with its depressions, and an upwardly extending spring-arm connected with said shaft, the free end thereof being adapted to normally engage said step or projection of said tumbler-arm, a trigger-member pivotally connected with said lever and adapted to ride against said cam-member, a spring-actuated kicker-arm pivotally connected with said lever, said kicker-arm being operatively connected with said trigger-member by means of a connecting-rod, and said kicker-arm being adapted to strike the downwardly extending arm of said tumbler to automatically release the engagement of the nosing thereof with said stud connected with said lever-arm, substantially as and for the purposes set forth.

In testimony, that we claim the invention set forth above we have hereunto set our hands this 26th day of July, 1909.

NATE J. MATTHEWS.
ROBERT LE GRAND JOHNSTONE.
ARTHUR W. CASH.

Witnesses:
FREDK. C. FRAENTZEL,
FRED'K H. W. FRAENTZEL.